United States Patent
Cox

(10) Patent No.: US 9,205,758 B2
(45) Date of Patent: Dec. 8, 2015

(54) ELECTRIC VEHICLE TRACTION CONTROL SYSTEM AND METHOD

(71) Applicant: Borealis Technical Limited, London (GB)

(72) Inventor: Isaiah W. Cox, Baltimore, MD (US)

(73) Assignee: Borealis Technical Limited, Gibraltar (GI)

( * ) Notice: Subject to any disclaimer, the term of this patent is extended or adjusted under 35 U.S.C. 154(b) by 0 days.

(21) Appl. No.: 13/707,589

(22) Filed: Dec. 6, 2012

(65) Prior Publication Data

US 2015/0005988 A1    Jan. 1, 2015

Related U.S. Application Data

(60) Provisional application No. 61/568,993, filed on Dec. 9, 2011.

(51) Int. Cl.

| | |
|---|---|
| *B60L 15/20* | (2006.01) |
| *B60L 3/10* | (2006.01) |
| *B60L 7/00* | (2006.01) |
| *B60L 7/18* | (2006.01) |
| *B60L 11/14* | (2006.01) |
| *B60L 11/18* | (2006.01) |

(52) U.S. Cl.
CPC ............ *B60L 15/20* (2013.01); *B60L 3/108* (2013.01); *B60L 7/006* (2013.01); *B60L 7/18* (2013.01); *B60L 11/14* (2013.01); *B60L 11/1803* (2013.01); *B60L 11/1877* (2013.01); *B60L 15/2009* (2013.01); *B60L 2200/10* (2013.01); *B60L 2220/12* (2013.01); *B60L 2220/14* (2013.01); *B60L 2220/16* (2013.01); *B60L 2220/18* (2013.01); *B60L 2240/12* (2013.01); *B60L 2240/421* (2013.01); *B60L 2240/423* (2013.01); *B60L 2240/425* (2013.01); *B60L 2240/461* (2013.01)

(58) Field of Classification Search
None
See application file for complete search history.

(56) References Cited

U.S. PATENT DOCUMENTS

| | | | | |
|---|---|---|---|---|
| 4,615,410 | A | * | 10/1986 | Hosaka ......................... 180/197 |
| 5,343,971 | A | * | 9/1994 | Heidelberg et al. ....... 180/65.245 |
| 5,450,324 | A | * | 9/1995 | Cikanek ........................ 701/108 |
| 5,492,192 | A | * | 2/1996 | Brooks et al. ................ 180/165 |
| 5,758,014 | A | * | 5/1998 | Young .......................... 388/815 |
| 6,002,979 | A |   | 12/1999 | Ishuzu |
| 6,007,454 | A |   | 12/1999 | Takahira et al. |
| 6,577,944 | B1 | * | 6/2003 | Davis .............................. 701/82 |
| 6,657,334 | B1 |   | 12/2003 | Edelson |
| 6,838,791 | B2 |   | 1/2005 | Edelson |
| 7,116,019 | B2 |   | 10/2006 | Edelson |
| 7,469,858 | B2 |   | 12/2008 | Edelson |
| 2005/0052080 | A1 | * | 3/2005 | Maslov et al. ............... 307/10.1 |

* cited by examiner

*Primary Examiner* — Rami Khatib

(57) ABSTRACT

A traction control system and method are provided for electric vehicles with at least one drive wheel powered by an electric drive motor to maintain optimum maximum traction while the vehicle is driven on the ground. The traction control system includes drive means capable of transmitting torque through a vehicle drive wheel and controllable to move the vehicle over a ground surface. A preferred drive means is an electric motor designed to move the vehicle at desired ground speeds in response to operator input. Operator input requests a desired speed, and the system determines drive wheel torque required to produce the desired speed and provides maximum current to produce maximum torque to drive the vehicle with optimum traction at the desired speed. The system uses constant feedback to find maximum current corresponding to torque required for an inputted speed request to automatically control traction in any electric powered vehicle.

9 Claims, 2 Drawing Sheets

ELECTRIC VEHICLE TRACTION CONTROL SYSTEM AND METHOD

PRIORITY CLAIM

This application claims priority from U.S. Provisional Patent Application No. 61/568,993, filed 9 Dec. 2012, the disclosure of which is fully incorporated herein.

TECHNICAL FIELD

The present invention relates generally to traction control systems and methods of traction control and specifically to a system and method for traction control in an electric powered vehicle, including an aircraft driven on the ground by an electric powered drive wheel.

BACKGROUND OF THE INVENTION

Traction control systems help to prevent or limit a vehicle's wheels from slipping during acceleration on different surfaces. Traction of a vehicle is established as its wheels contact a surface so that when the wheels are rotated, usually by a driving force, the vehicle will be moved along the surface in a desired direction. The combination of the coefficient of friction and the force exerted by a wheel against the surface produces traction. When the coefficient of friction of the surface is less than the force exerted, the wheel will slip during acceleration of the vehicle, adversely affecting acceleration performance and driving stability. Slippage can occur as a result of excessive accelerative forces applied to vehicle wheels or inadequate wheel to surface friction that can be present with wet or icy conditions. Once the condition is recognized, a vehicle driver, particularly in an automobile or like vehicle, may try to control slippage by reducing engine power or by applying the brakes, both of which can reduce the speed at which a drive wheel is rotating. The driver may not be immediately aware that slippage is occurring, however, and may not be able to take corrective action as quickly as required.

Various traction control systems have been proposed for automobiles and like vehicles to automatically adjust traction between the vehicle's drive wheels and the road or ground surface to minimize acceleration slip. These include, for example, systems that control traction using braking force adjustment, engine throttle control, and engine fuel supply control. Other traction control systems for automotive use have also been proposed. In U.S. Pat. No. 6,002,979 to Ishizu (Nissan), for example, an automobile traction control system in combination with a fuel supply system that adjusts driving torque delivered to each drive wheel by adjusting engine power is described. This system monitors slipping of a drive wheel with respect to a target drive wheel speed and includes engine control means that cooperates with a fuel supply system to decrease engine power by decreasing fuel supplied in response to a detected slipping condition. This system is sensitive to preventing engine stall when the speed of the drive wheel is reduced to a target drive wheel speed. A plurality of sensors is employed to assist with the electronic control of the Ishizu traction control system.

The traction control device disclosed in U.S. Pat. No. 6,007,454 by Takahira et al (Toyota) automatically detects slipping conditions of each of the pairs of wheels in a four wheel drive automobile by comparing the mean rotational speed of the front or rear drive wheels to a threshold value. A brake system is electronically controlled to apply brakes to at least one of the pairs of front or rear wheels, thereby executing traction control according to a selected gear transmission ratio. When optional vehicle speed sensors are included in this system and wheel rotation speeds are compared to vehicle speed, the automobile's engine can be controlled to decrease rotational power output. Neither of the systems described in the aforementioned patents would effectively control traction in a vehicle that is powered solely by an electric drive motor or other electric drive means Traction control systems useful in hybrid and electric vehicles, primarily automobiles, have also been proposed. U.S. Pat. No. 5,450,324 to Cikanek (Ford), for example, discloses a combined traction control and antiskid braking system operatively connected to an electric traction motor and a hydraulic braking system. Present vehicle parameters are monitored by sensors, and a processor responsive to the sensors calculates vehicle parameters not directly measurable to determine whether the vehicle state requires traction control or braking control. A control strategy based on the determined vehicle state is used by the processor to provide commands to a motor controller to control operation of the electric traction motor by reducing motor torque if traction control is appropriate or, alternatively, to a brake controller if hydraulic or regenerative antiskid braking control is needed. The main focus of the traction control and braking system disclosed by Cikanek is to maximize regenerated kinetic energy during braking and minimize kinetic energy loss due to wheel slip, primarily to overcome battery energy storage limitations. The use of an electric drive motor or other electric drive means to control traction is not suggested.

The traction control system described in U.S. Pat. No. 6,577,944 by Davis uses existing engine speed sensors to determine the occurrence and degree of wheel slippage by comparing whether two successive engine speed readings exceed a selected threshold and generates an automatic proportional corrective action from the vehicle's engine, braking system, or both. This system is designed primarily for automotive internal combustion engines and/or electric motors, although some limited non-automotive uses in which a drive unit applies torque to a rotating component that must overcome resistance are suggested. These include a turbine rotated by an electric drive motor and a power boat with an internal combustion engine-driven propeller or screw. It is not suggested that speed measurements could be eliminated or that torque output of a drive unit or motor in the absence of speed measurements could be controlled to control traction or that traction could be controlled in an aircraft drive wheel.

A traction control system and method that eliminates the use of an electric vehicle's antilock braking system to perform traction control is described by Young in U.S. Pat. No. 5,758,014. A power inverter or controller uses rotor speed to control torque output of the electric vehicle's motor and thereby control traction. An encoder coupled to the rotor provides signals that indicate rotor speed. Alternatively, the encoder could be replaced by wheel sensors. An algorithm monitors the rate of change of the rotor speed as an indication of vehicle speed and compares the rate of change of rotor speed to a programmable threshold value to determine wheel slippage. A torque command from a controller controls the amount of current applied to the motor and the torque generated by the motor. When a loss of traction is experienced, reducing torque decreases the rotor speed and allows the vehicle's drive wheels to regain traction. The commanded torque value is based on the vehicle accelerator pedal position or cruise control torque. It is not suggested that the described speed measurements could be eliminated or that electrical parameters affecting current of an electric motor could be used to directly control traction by maintaining a maximum supply of current in a response to a requested or commanded speed.

A need exists, therefore, for a traction control system and method of controlling traction in an electric vehicle that relies on direct control of the current supply to an electric motor driving the vehicle wheels to maintain a maximum current supply for a vehicle operator commanded speed and control traction.

SUMMARY OF THE INVENTION

It is a primary object of the present invention, therefore, to provide a traction control system and method that directly controls electric operating parameters and current supply to an electric motor driving vehicle wheels to control traction.

It is another object of the present invention to provide a traction control system and method that controls traction in an electric vehicle by providing a maximum current to an electric drive motor in response to a specific operator speed command.

It is an additional object of the present invention to provide a traction control system and method for electric vehicles that controls traction by modulating a torque/speed relationship to modulate vehicle wheel speed when the wheel is slipping.

It is a further object of the present invention to provide a traction control system and method that can be effectively employed to automatically control traction in an electric vehicle under a wide range of ground surface and environmental conditions.

It is yet an another object of the present invention to provide a traction control system and method useful for controlling traction in any vehicle in which drive wheels are powered by electric drive motors to move the vehicle on a ground surface.

It is yet a further object of the present invention to provide a traction control system and method for an aircraft equipped with drive wheels driven by electric drive motors to move the aircraft autonomously on the ground without reliance on aircraft engines.

It is a still further object of the present invention to provide an effective traction control system and method that controls traction in electric vehicles by providing a maximum current to an electric drive means in response to a specific operator command that can be employed alone or in combination with available traction control systems.

In accordance with the aforesaid objects, a traction control system and method are provided for electric vehicles with one or more drive wheels powered by electric drive motors to maintain optimum maximum traction while the vehicle is driven on the ground. The traction control system includes drive means capable of transmitting torque through a vehicle drive wheel and controllable to move the vehicle over a ground surface. The drive means is preferably an electric motor designed to move the vehicle at desired ground speeds in response to operator input. Operator input requests a desired speed, and the system determines drive wheel torque required to produce the desired speed and provides maximum current to produce maximum torque to drive the vehicle with optimum traction at the desired speed. The system uses constant feedback to find maximum current corresponding to torque required for an inputted speed request to automatically control traction in any electric powered vehicle.

Other aspects of the present electric vehicle traction control system and method and objects of the present invention will become apparent from the following description, drawings, and claims.

BRIEF DESCRIPTION OF THE DRAWINGS

FIG. 3b is a schematic representation of a pair of aircraft drive wheel assemblies equipped with electric drive means mounted on the aircraft of FIG. 3a.

DESCRIPTION OF THE INVENTION

Figure 1:
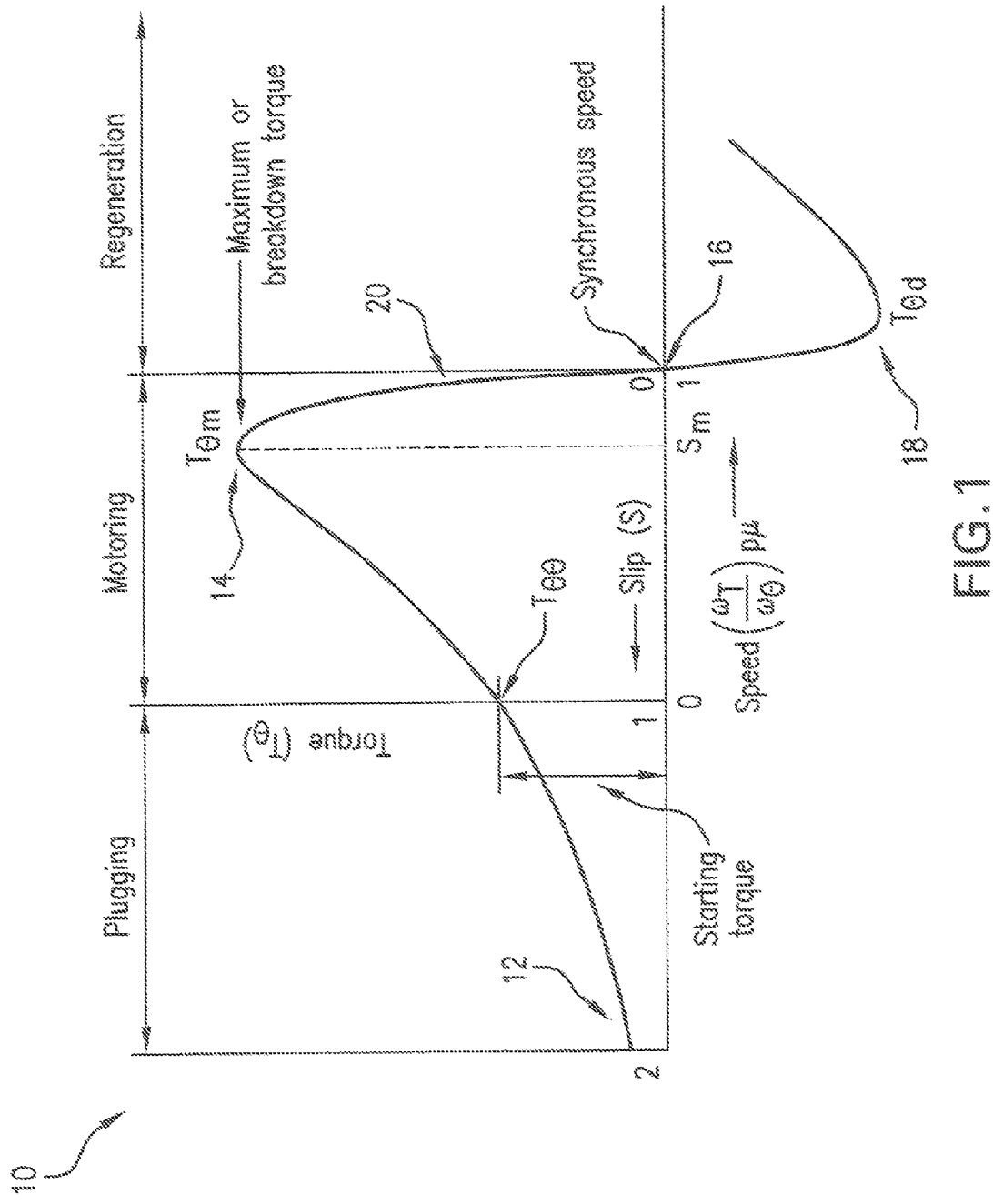
FIG. 1 illustrates a torque/speed curve for an electric drive motor controllable to achieve optimum traction control according to the present invention.

Traction control in any vehicle, whether powered by an electric motor or another power source, requires modulating the rotational speed of the drive wheels to match the vehicle travel speed over a ground surface. Wheel rotational speed is generally reduced by braking, for example, although other methods can also reduce speed, depending on the vehicle's power source. Driving traction is produced by the force of the vehicle's wheels against the ground surface and the surface coefficient of adhesion or friction, $\mu$. The force of a wheel, which is directed perpendicularly toward the ground surface, may be described as including a proportional force normal to the surface and a proportional force parallel to the surface. The proportional force normal to the surface is part of the traction frictional force. If a sufficiently large torque or drive force is applied from the wheel to the ground surface tangent to a contact point between the wheel and the surface, the frictional grip, or static friction, between the wheel and the surface will be overcome. This causes the wheel to slip in relation to the surface so that the wheel is rotating at a higher surface speed than its forward travel velocity, which creates a greater opportunity for slippage of the wheel. When a driving torque is applied to a vehicle tire through the wheel, a tractive force, proportional to $\mu$, develops at the area where the tire mounted on a wheel contacts the ground surface, known as the contact patch. The tire tread in front of and within in the contact patch is subject to compression while the wheel is being driven. As a result, the distance the tire and wheel travel when subjected to a driving torque will be less than when the tire and wheel are free rolling. Unless the load is such that the wheel is restrained and/or corrected, the wheel will continue to rotate at an increasingly faster speed, and continued control of vehicle speed or travel direction presents challenges.

A range of different kinds of electric drive motors can be used to provide the power required to drive a wide variety of wheeled vehicles, including but not limited to, automobiles, trucks, trains, construction vehicles, military vehicles, aircraft, drones, unmanned aerial vehicles, and the like, on different kinds of ground surfaces. The types of electric motors used for this purpose can include, for example without limitation, toroidally-wound motors, axial flux motors, permanent magnet brushless motors, synchronous motors, asynchronous motors, pancake motors, switched reluctance motors, electric induction motors, or any other electric motor geometry or type known in the art. The drive motor selected should be able to drive at least one vehicle wheel at a desired speed and torque. The present traction control system and method will also function effectively with other numbers of drive wheels. Different numbers of drive wheels will be required for different applications, and the number of drive wheels is not intended to be limited. One kind of electric drive motor preferred for this purpose is a high phase order electric motor of the kind described in, for example, U.S. Pat. Nos. 6,657,334; 6,838,791; 7,116,019; and 7,469,858, all of which are owned in common with the present invention. A geared motor, such as that shown and described in U.S. Pat. No. 7,469,858 for example, is designed to produce the torque required to move a vehicle such as a commercial sized aircraft at an optimum speed for ground movement. The disclosures of the aforementioned patents are incorporated herein by reference.

Other motor designs capable of the torque operation across a desired speed range required to move a specific vehicle on a ground travel surface may also be suitable for use in the present invention. One preferred motor is a high phase order induction motor with a top tangential speed of about 15,000 linear feet per minute and a maximum rotor speed of about 7200 rpm, although motors with other tangential and rotor speeds may be more suitable for moving other vehicles and are also contemplated to be within the scope of the present traction control system. The aforesaid motor is particularly preferred for driving aircraft drive wheels.

Both the electric motor selected to drive a particular vehicle and its load may be described by their torque/speed curves and their inertia. Normal steady state operation occurs at the point where torque supplied by the motor equals the torque consumed by the load. Any difference between torque supplied and torque consumed means that speed must change. The rate of speed change is determined by the torque difference and the connected inertia. FIG. 1 illustrates an exemplary torque/speed curve 10 for a high efficiency induction motor. It can be seen that the torque/speed curve starts at a negative speed at 12, reaches a peak 14 at break-away speed, drops roughly linearly to zero at synchronous speed at 16, and then falls asymptotically to zero again at 18. Such motors produce nominal full torque at about 50 revolutions per minute (RPM) below the synchronous speed, and the essentially linear output torque is the difference between synchronous speed and actual speed. Peak torque is generally 2 to 3 times the nominal operating torque; generally regeneration peak torque is not equal to motoring peak torque. The torque/speed curve of FIG. 1 is a steady state approximation with its own dynamics.

An electric motor torque/speed curve is directly controlled by electrical operating parameters, including, for example, drive frequency and drive voltage, preferably through an inverter in communication with the motor. Drive frequency sets motor synchronous speed, and the inverter directly controls the drive frequency. The synchronous speed is the speed at which the motor's torque falls through zero, as shown at 16 in FIG. 1. Above the synchronous speed, the motor actually acts as a generator and produces a negative or braking torque. This can introduce an important failure mode, since extensive regeneration will cause DC rail voltage to increase, and inverter components can be damaged. The drive voltage sets motor magnetic flux density, which sets the magnitude of the curve. An induction motor has a characteristic torque/speed curve that stays relatively constant in overall shape. Setting the synchronous speed sets where this curve crosses the speed axis, and the applied voltage acts as a scale factor on this curve. Magnetic flux density can adjust the torque scale, and synchronous speed slides the curve from side to side.

Because a motor torque/speed curve is controlled by two parameters, generally any specific single value of torque and single value of speed is a member of a family of different torque/speed curves. As a result, operating voltage can be traded for slip. The difference between speed of the motor's rotor and synchronous speed is identified as rotor slip and is expressed as a fraction of synchronous speed or as rotor slip frequency and expressed in Herz (Hz) or in radians per second. Normal motor operation generally uses a rotor slip frequency of less than 2 to 3 Hz, which indicates operation in the nearly linear region 20 of the torque/speed curve of FIG. 1 between breakdown torque and synchronous speed. Ideally, a torque/speed curve can be predicted, given different drive voltage and frequency inputs and motor state inputs, including temperature and the like. The traction control system and method of the present invention does not directly control the torque output of the motor; rather, the switching elements in an inverter that supply power to the motor are controlled. Parameters controlled directly are voltage, actually pulse width modulation (PWM), drive frequency, and phase sequence. A motor model useful with the traction control system and method of the present invention will allow the prediction of a torque/speed curve, like that of FIG. 1, given different inputs of drive voltage and frequency and inputs of motor state, such as, for example, temperature and the like.

In an example of traction control in a vehicle powered by an electric motor, an open loop type of torque control can be used effectively. Vehicle operator input, adjusted as required by limit laws, temperature limits, wheel slip control, and the like, sets a motor commanded torque value, preferably based on a motor model as described above. A torque/speed curve that optimizes efficiency to produce a motor commanded torque at an expected rotor speed is selected. A particular torque/speed curve will only produce a commanded torque if the rotor speed is as expected. If the actual rotor speed is different from that used in the calculations, the output torque will be different. When motor torque is commanded, the following events occur. Given the present speed of the rotor, drive frequency and voltage that will produce a rotor speed on the torque/speed curve at the desired torque are calculated. Obtaining an accurate desired torque requires a good motor model and an accurately obtained rotor speed. In the present traction control system and method, motor torque is not actually programmed; instead, the motor torque/speed curve is programmed.

Vehicle operator inputs can include, for example, motor commanded torque (from desired vehicle speed), rotor speed, motor stator temperature, and available inverter voltage. Rotor speed can be instantaneous or averaged and may be measured directly, such as with a resolver or the like, or predicted using available sensorless techniques. Although acceptable function of the system is possible without valid temperature data, improved motor performance and torque accuracy are improved when temperature correction is performed, preferably after directly measuring temperature either a sensor or stator winding resistance. The available inverter voltage is obtained by directly measuring DC rail voltage. In this open loop motor torque control system, updating of frequency and voltage values should preferably occur between 5 and 10 Hz. Since the update rate provides a natural limit to wheel acceleration, it is preferred that this is low to facilitate wheel loss of traction detection. Alternatively, open loop frequency and voltage values can be updated at a high rate, but filtering the rotor speed to limit wheel acceleration is required. In the open loop situation described, an induction motor is a very good approximation of a constant speed device. If, for example, a synchronous speed of 2000 rpm is programmed, the motor will naturally remain in the range of 2000 rpm±50 RPM over its entire torque capability.

During a loss of traction, excess torque, applied by the motor to a gear train to a wheel but not transferred through a contact patch will cause the wheel and gear box to accelerate.

As the rotor, gear box, and wheel accelerate, the output torque of the motor will naturally drop. The torque demanded by a slipping wheel is not zero, and at an equilibrium point where the wheel is spinning more rapidly than the vehicle is moving, but slower than synchronous speed, the wheel is still capable of providing some traction. Because of the steepness of the torque/speed curve at 20 near synchronous speed at 16 (FIG. 1), the difference between normal operating speed and this initial slipping speed will actually be quite small. For example, 50 rpm at the motor is 2.5 rpm at the wheel so that in a vehicle with a wheel radius of about 11.5 inches, for example, a 2.5 rpm speed difference is a 900 ft/hr speed difference, which is not very much slip. Even at zero output speed, an induction motor still needs to have about 50 rpm of slip. Consequently, the motor magnetic field will be rotating at 50 rpm even as the motor's rotor is stationary. In the event of a loss of traction from when the vehicle is at a standstill, the motor will start spinning at something less than 50 rpm. The exact speed will depend upon the commanded torque and the actual torque taken by the contact patch.

As discussed above, in an open loop control feedback system, during normal torque control operation, the changed speed of a vehicle wheel must be detected, and this information will be supplied to a processor to be compared to a motor model torque/speed curve to calculate a new synchronous speed to use to produce a desired torque. In a loss of traction situation, the contact patch is already slipping and cannot support the desired torque, so the wheel accelerates more to the new synchronous speed. If this process continues, the wheel will spin out of control. Sudden acceleration of a wheel can also provide a way to detect the existence of wheel slip and allow a different control loop to take over. The acceleration of a slipping wheel is likely to be substantially greater than the acceleration of that wheel if the wheel is driving a vehicle. Friction associated with spinning up the wheel is very low, and the net result is that during a loss of traction, the wheel speed will accelerate in a step fashion to a new speed, with the acceleration step far more rapid than anything the vehicle itself could do.

Once this loss of traction is detected, a number of different approaches can be taken. For example, the vehicle operator could reduce the requested speed so the torque drops to zero, wait long enough for the wheels to stick to the surface, obtain a new measure of speed, and then bring torque back up until traction is lost again. Alternatively, the slip as measured right after the acceleration event could be used to estimate the slipping torque that the wheel is applying through the contact patch to the ground surface, and the motor model could be used to put this torque at what is assumed to be the correct speed, which should cause the wheel to slow down and stick to the surface. Torque could then be brought up again until traction is lost. Another alternative is to ignore that the wheel is slipping and use some other measure of vehicle speed to enter a speed control mode where synchronous speed and ground speed are separated by a value that should give a commanded or target torque. Either the target torque is reached or the wheel slips slightly.

During a slip condition in a vehicle with an open loop torque control system, a wheel may accelerate to just short of synchronous speed, and then acceleration would stop, with no further acceleration until the torque control system updates the synchronous speed. Large and sustained acceleration is only possible if the synchronous speed is updated. Otherwise, acceleration pulses must be detected. If wheel slip conditions are not properly detected, an acceleration pulse will be produced each time synchronous speed is updated. On detection of a wheel slip event, control of wheel slip is likely to take precedence over open loop torque control.

A method that could be used to detect if a wheel is slipping involves detecting sudden acceleration. Rather than look for a single sudden acceleration event, however, a vehicle operator should look for a modulated acceleration. For example, to control the motor, both synchronous speed and the "stiffness" of the motor torque/speed control curve are directly controlled. The stiffness of the torque/speed response is set by motor magnetic field strength, which is set by the ratio of applied voltage to drive frequency. A wide range of synchronous speed and stiffness will give the same output torque at the same target speed, which amounts to selecting the family of torque/speed curves that all go through a single target operating point. Normally, a specific torque/speed curve that produces optimal efficiency is selected. Switching between two or more torque/speed curves, ideally two curves that both show a reasonable, if not optimal, efficiency of different combinations of synchronous speed and torque stiffness, should give the same torque at a target wheel speed. If a wheel is not slipping, and the speed estimate and motor model are correct, then this modulation will be virtually undetectable. Motor torque will remain constant, and speed should remain constant. If the wheel is released from the ground surface, however, the torque/speed curve modulation will be seen as a modulation of wheel speed.

An electric motor can be used to measure available vehicle traction in a number of ways. Given a fixed torque/speed curve, motor output torque can be calculated by knowing rotor speed. This is done by running the same motor model calculations used for the open loop torque control, but in reverse. Since torque naturally drops to zero at a speed only slightly faster than a wheel not slipping speed, the wheel slipping traction can be measured. Another approach is modulation of the torque/speed curve. By adjusting both drive frequency and drive voltage, different torque/speed curves that all share the same target operating point can be commanded. If the motor is actually operating at the target operating point, this modulation will have virtually no effect on wheel operation. However, if the motor is not at the target operating point, but the wheel has traction, torque pulsations will be produced. Finally, if the wheel is slipping, then modulating the torque/speed curve will modulate the wheel speed. A third approach is torque modulation. If the wheel is slipping, and the torque is reduced to zero, the wheel will quickly stop slipping. Torque can then be restored until the wheel slips again. Wheel slip can be probed by raising the torque above the point of the last slip event.

As indicated above, the traction control system of the present invention can be used effectively with a wide range of electric powered vehicles. The vehicles discussed below are intended only as exemplary of two possible electric powered vehicle types with which this system can be used to maintain optimum traction while the vehicle is driven over a ground surface. The use of the term "wheel" is also intended to include a tire mounted on a wheel. As noted above, the contact patch referred to herein describes the area of contact between a wheel and the ground surface over which the wheel is traveling or a tire mounted on the wheel and the ground travel surface.

Figure 2:
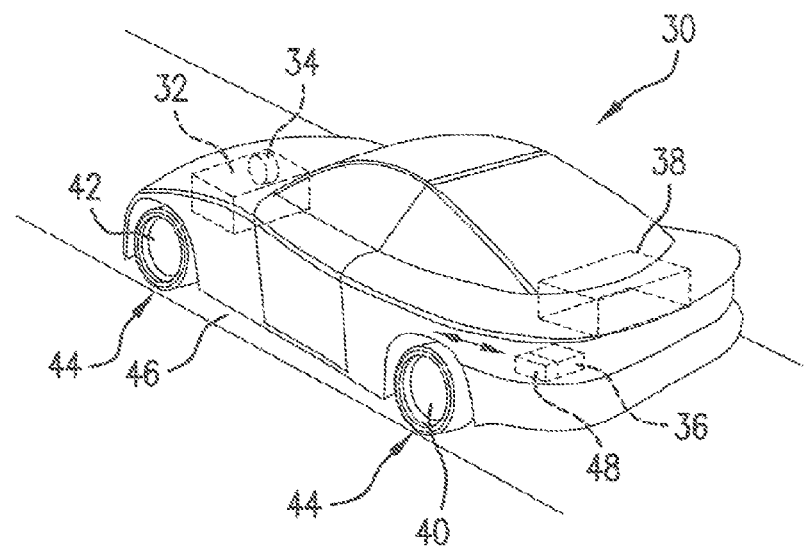
FIG. 2 is a diagrammatic representation of an electric powered automobile wherein traction is controlled according to the present invention.

FIG. 2 is a diagrammatic illustration of an electric powered automobile 30. The automobile has an electric drive motor 32 with a rotor 34. An inverter 36 directs power to the drive motor 32 from a power supply 38, such as, for example, an array of electric batteries or the like. A rear drive wheel 40, preferably one of a pair of drive wheels, is driven by electric power provided by the electric motor 32. Only one drive wheel 40 of a pair of rear drive wheels is shown in FIG. 2. A pair of front drive wheels, including drive wheel 42, would be located at the front of the automobile in a front wheel drive vehicle. A wheel/ground surface contact patch 44 is shown between wheels 40 and 42 and a ground travel surface 46. A traction control system controller 48 that preferably includes a processor, controller, and intelligent software, is provided to perform system traction control functions as described herein. The traction control system of the present invention can also be used effectively in a four wheel drive vehicle. At least one drive wheel is required for traction control in accordance with the present invention. Control of traction for any number of drive wheels can be achieved by the present system and method.

In operation, the driver of the automobile selects a desired travel speed, and software in the system controller 48 uses feedback to continuously find the maximum current draw from the inverter 36 to the electric motor 32 to maintain a torque that will produce the desired speed. The traction control system can be set by continuously finding a highest current consumption case, within a given range, and applying that identified maximum current. If the current decreases, that is an indication that one or more of the drive wheels are slipping. The traction control system will automatically cause the torque and, thus, the speed to be decreased until optimum traction is restored. Feedback mechanisms, including those described above, can be used to automatically maintain the current as close to 100% as possible, although if the current is set to less than 100%, wear on tires mounted on the drive wheels will be reduced. Maintaining the current at a level in the range of about 95% to 98% of maximum current effectively reduces tire wear and still maintains optimum traction.

Figure 3A:
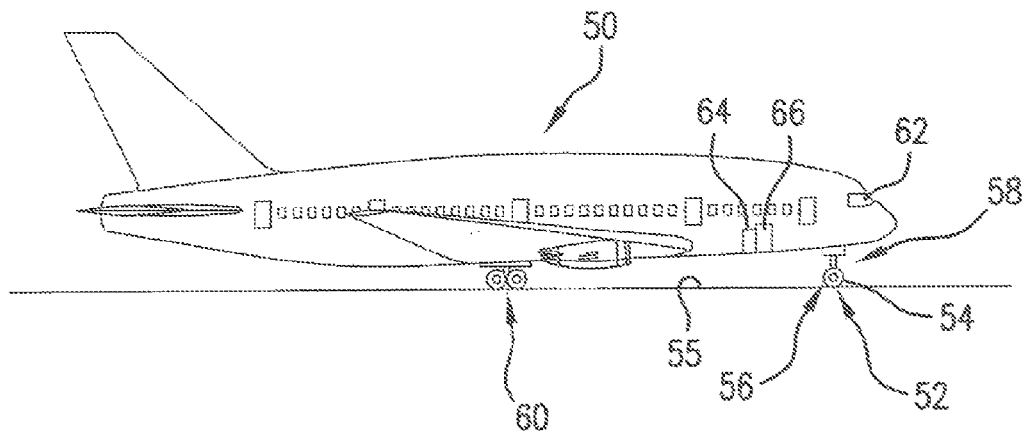
FIG. 3a is a side view of an aircraft with landing gear wheel drive assemblies powered by electric drive means to move the aircraft independently on the ground whereby traction is controlled according to the present invention.

FIG. 3a illustrates, in side view, an aircraft 50 equipped with a ground travel control system that includes a pair of drive wheel assemblies 52 with electric drive means 54, preferably electric motors as described above, capable of translating torque through at least one drive wheel 56 to drive the aircraft autonomously on a ground surface 55 without reliance on the aircraft's engines. Although a pair of drive wheel assemblies is shown and described, the present traction control system and method will operate effectively with one drive wheel assembly 52. The drive wheel assemblies 52 are shown on the aircraft nose landing gear 58, which is the preferred location. One or more drive wheel assemblies could also be located on a main landing gear, such as at 60. Electric power for the electric motors 54 is directed, preferably through one or more inverters (not shown) associated with the motors 54 from an aircraft power source 64, which is preferably the aircraft auxiliary power unit (APU). Aircraft ground travel speed controls are included in the array of controls (not shown) provided in the aircraft cockpit 62 so that an aircraft pilot can input a desired speed for moving the aircraft on the ground using the ground travel system electric motor or motors. A traction control system controller 66, which is similar to controller 44 in FIG. 2, is provided in a convenient location relative to the motors 54 and preferably includes processor and controller elements as well as intelligent software capable of controlling traction as described herein. The traction control system of the present invention automatically converts speed to torque and provides the maximum electric current required to provide the requested torque to drive the aircraft's wheels to move the aircraft independently during ground travel at the desired speed. When the pilot commands a speed, the present traction control system software uses feedback, as described herein, to continuously find the maximum current draw for that speed request, automatically optimizing traction. Although optimum traction can be achieved without measuring or inferring wheel or aircraft speed, there are circumstances when such measurements may be needed and can be obtained as described above.

During an aircraft drive wheel slip condition, there is a sudden change in the load/torque speed curve (FIG. 1) and a change in the connected inertia. The torque load is likely to drop considerably because an aircraft wheel contact patch 68 cannot sustain significant shear force. Inertia is also likely to drop significantly, since the drive motor (54) will now be coupled only to a drive wheel (56) and not to the entire aircraft. When the wheel contact patch 68 slips, the wheel and motor will accelerate at a rapid rate, and as the wheel accelerates, the motor accelerates toward synchronous speed. Motor torque output will drop. In addition to the motor forces driving the wheels, several mechanical "springs" will act on the wheels. When the wheel contact patch 68 is released, the aircraft nose strut 70 will move backward toward the main landing gear 58, momentarily reducing the ground speed of one or more of the nose wheel drive assemblies 52. When the wheel contact patch 68 releases, the wound "spring" of the wheel and a gear train that is preferably associated with the motor will unwind, causing the wheel to accelerate. When the wheel contact patch releases, the unwinding "spring" of the wheel will change the effective radius of the wheel. Assuming nothing changes, then, in the slipping condition, a new equilibrium condition will result. Although the wheel is slipping, there will still be some friction at the contact patch 68, and the wheel load will still have a torque/speed curve (FIG. 1).

Another method for detecting a loss of traction in an aircraft drive wheel like a drive wheel 56 involves comparing the moment of inertia of a drive wheel to the moment of inertia of the aircraft. If all the wheel mass is assumed to be concentrated in a ring with the radius of the contact patch 68 formed between the wheel 56 and ground surface 55, then the ratio of the wheel inertia to aircraft inertia is the mass ratio. Additionally assuming that the wheel weighs 100 kg and half of the aircraft mass is 25,000 kg, then this is a 250:1 difference in acceleration rate at a given torque, ignoring friction. While this may overstate the wheel inertia, the acceleration of a slipping wheel may be 100 to 500 times the acceleration of that wheel, if it is driving an aircraft. The friction associated with spinning up the wheel is very low, mainly from ball bearings, while the friction for accelerating the aircraft is a large fraction of the available tractive effort. The net result is that during a loss of traction, the wheel speed will accelerate in a step fashion to a new speed, with the acceleration step being far more rapid than any acceleration from the aircraft itself. When this loss of traction is detected, any of the approaches discussed above could be used to restore or maximize traction.

Loss of traction on one or more aircraft nose gear 58 drive wheels 56 will mean a loss of acceleration and will reduce nose wheel steering. Even a slipping spinning nose wheel will provide lateral force and turning moment. The weight on the main landing gear 60 and the differential braking ability of the main landing gear will provide some aircraft steering capability in the event the nose gear drive wheels have completely lost traction.

Figure 3B:
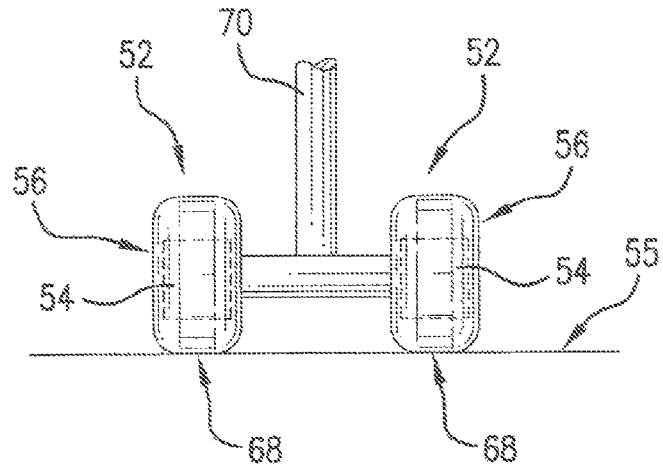

Traction control can rely on the direct and indirect measurement of wheel and vehicle speed, as well as inferred and computed true speed and acceleration. The present invention bases traction control on measuring current provided to a drive motor powering a vehicle drive wheel against speed. The relationship between speed and torque is shown and described in connection with FIG. 1. The current to be supplied to a drive motor or motors is compared with vehicle operator speed demands as described in connection with FIGS. 2, 3*a* and 3*b*. In the case of an aircraft, a pilot inputs a speed command or requests a desired aircraft ground travel speed. As discussed above in connection with controlling electric automobile traction, software uses feedback to continuously find the maximum current draw for that speed request. When more speed is demanded by a pilot or other vehicle operator, the current or power draw should increase. When power draw does not increase, the system backs up the commanded drive frequency to a peak and continues hunting high and low to ensure that the commanded drive frequency remains near or below that peak. When the drive motors seeking to input a required torque to the wheels detect either a current drop or a flattening of the slope in the torque/speed curve (FIG. 1), the system deducts that wheel slip is occurring. The moment of maximum traction will be at or slightly below the peak current draw; when the wheels slip properly, power draw is reduced. This traction control system does not rely on speed measurements or other inputs or calculations to determine slip. If a higher speed input does not require a higher power draw, the wheels are slipping. The operation of the system is the same whether the aircraft or other vehicle is traveling on a hill or whether there is a head or tail wind or some other environmental condition that could affect vehicle speed and/or traction.

A resolver could be used for motor position sensing, which can make low speed resolution almost trivial. A resolver useful in this instance is an analog device with only a few pulses per revolution that has the analog capability to resolve fractional "pulse" position. A resolver to digital chip should be able to report both position and speed with between 10 and 16 bit resolution. This arrangement may be limited to the lowest resolution for speed reasons, which would produce about 1024 counts per resolution at the motor and about 20 times this at the wheel. In an aircraft, if both nose drive wheels lose traction, based on maximum motor torque and aircraft mass a reference rotation value should not increase faster than about 0.5 m/sec$^2$. This value may change, such as, for example, in a situation in which a light aircraft is traveling downhill with a tailwind.

Loss of traction could also be detected by measuring control states indicative of motor torque, such as, for example, the relationship between AC current and current phase and/or the relationship between AC voltage and frequency. A review of these values will detect a loss of traction.

The traction control system of the present invention can effectively maintain traction during electric vehicle ground travel under adverse weather conditions. Preventing wheel slip and maintaining optimum traction on reduced traction ground surfaces and/or during adverse environmental conditions has presented a particular challenge for available traction control systems. The present system maximizes traction control under a wide range of surface conditions where traction is reduced. The system software detects the speed on a ground surface that will draw maximum power, as discussed above, to optimize traction. When the ground surface is covered with ice, for example, and the current is maximized, maximum heat and pressure are transferred from one or more wheel to the icy surface to melt ice under the wheels, allowing the vehicle wheels to obtain better traction. As the ice melts, the ground surface is exposed, and traction can be maximized. The vehicle controls could include a specific deicing mode setting that the operator could set manually to draw maximum current and activate deicing action when a ground travel surface, whether a road, runway, rails, or the like, is ice covered and likely to cause a loss of traction.

Another variation of the present traction control system is programmed to take into account known or inferred losses from heating between the motor and the contact patch where the wheel meets the ground. This could include, for example, heat losses from electronics, wires, and gears as well as the motor. Aiming for a peak current draw that is less than 100%, such as on the order of 98%, for example, might be more appropriate in this situation. The peak current draw could also be considered to occur when a drop off in a still-climbing torque/speed curve (FIG. 1) is detected.

An additional approach to traction control is provided by the present invention. This approach is intended primarily for aircraft with electric drive-controlled ground travel systems, but could also be adapted for other vehicles. Instead of building traction control into the aircraft or vehicle drive system, a control device commonly used to control the drive system, such as, for example, a joystick in an aircraft cockpit, could be adapted to incorporate control features of a traction control system and would be controllable to interact with the drive system to control traction. The joystick preferably is designed to be a force feedback joystick. The position of the joystick will communicate a desired motor torque to the drive system. The force feedback is set by the torque that the motors are actually producing. In the event of a loss of traction, the motors will accelerate until acceleration limit laws programmed into the system are reached, when the output torque will decrease. The pilot or other vehicle operator will feel the drop in torque through the joystick and can respond manually to restore traction to an optimum state.

The electric vehicle traction control system and method of the present invention has been described with respect to preferred embodiments. This is not intended to be limiting, and other arrangements and structures that perform the required functions are contemplated to be within the scope of the present invention.

INDUSTRIAL APPLICABILITY

The electric vehicle traction control system and method of the present invention will find their primary applicability in maintaining optimum traction between wheels and ground surfaces in a wide range of vehicles that employ electric powered drive means to move the vehicles over these surfaces. The present traction control system and method can be applied to maintain optimum traction under adverse and other environmental and ground conditions in electric powered vehicles including automobiles and like vehicles, light and heavy construction vehicles, military vehicles, aircraft, drones, unmanned aerial vehicles, and trains.

The invention claimed is:

1. A system for controlling and maintaining optimum traction between wheels of a vehicle and a surface on which said vehicle is driven, wherein said vehicle is equipped with one or more drive wheels electrically powered to drive said vehicle, said traction control system comprising:
   (a) electric drive means designed to translate torque through said one or more drive wheels to drive said vehicle on said surface;
   (b) a vehicle operator input actuatable to input a desired vehicle speed into said traction control system;
   (c) a processor adapted to receive the desired vehicle speed and automatically determine a maximum electric current to be supplied to said electric drive means to translate torque required to drive the vehicle at the desired speed and optimum traction to said one or more drive wheels;
   (d) a controller adapted to automatically control, in response to said processor maximum electric current determination, a supply of electric current to said electric drive means corresponding to said maximum electric current and maintain said supply of electric current to drive said vehicle at said desired speed and optimum traction until said vehicle operator input is actuated to input a different desired speed into said system; and (e) vehicle controls comprising an automatically or manually controllable deicing mode activatable to generate sufficient heat and pressure between said one or more drive wheels and said surface to melt ice on said surface, thereby improving traction, when said controller determines that less than a maximum supply of power indicates a loss of traction and said ground surface is ice covered.

2. The traction control system of claim 1, wherein said vehicle is an electric powered vehicle selected from the group comprising automobiles, trucks, construction vehicles, military vehicles, aircraft, and trains.

3. The traction control system of claim 2, wherein said vehicle is an automobile.

4. The traction control system of claim 2, wherein said vehicle is an aircraft.

5. The traction control system of claim 1, wherein said electric drive means comprises an electric motor selected from the group comprising toroidally-wound motors, axial flux motors, permanent magnet brushless motors, synchronous motors, asynchronous motors, pancake motors, switched reluctance motors, and electric induction motors.

6. The traction control system of claim 1, wherein said processor comprises software adapted to automatically intelligently determining a torque/speed curve controlled by electrical operating parameters for said electric drive means and the torque translated to said one or more drive wheels depends on the desired vehicle speed inputted into said system.

7. A system for controlling and maintaining optimum traction between wheels of a vehicle equipped with one or more drive wheels electrically powered to drive said vehicle and a surface on which said vehicle is driven, said traction control system comprising:

(a) one or more electric drive motors controllable to translate torque through said one or more drive wheels to drive said vehicle on said surface in communication with a source of electric power through one or more inverters;

(b) a vehicle operator input in communication with switching elements in said one or more inverters comprising at least motor commanded torque from desired vehicle speed, rotor speed, motor stator temperature, and available inverter voltage;

(c) a processor adapted to receive a selected vehicle operator input and to automatically determine a maximum electric current to be supplied to said one or more electric drive motors to translate the torque required to drive the vehicle at a desired speed and optimum traction for surface conditions to said one or more drive wheels, said processor comprises software adapted to program and select a motor torque/speed curve for the said one or more electric drive motors that optimizes efficiency to produce the motor commanded torque at an expected rotor speed and to set the motor commanded torque at the expected rotor speed; and (d) a controller adapted to control automatically, a supply of electric current from said source of electric power to said one or more inverters corresponding to said maximum electric current to maintain the motor commanded torque at the expected rotor speed in accordance with the selected motor torque/speed curve and drive said vehicle at said desired speed and optimum traction.

8. The traction control system of claim 7, wherein said vehicle is an electric powered vehicle selected from the group comprising automobiles, trucks, construction vehicles, military vehicles, aircraft, and trains.

9. The traction control system of claim 8, wherein said vehicle comprises an aircraft, said one or more electric drive motors comprise high phrase order electric induction motors, and said motor torque/speed curve has a constant shape.

* * * * *